United States Patent [19]

Scheetz et al.

[11] Patent Number: 5,466,761
[45] Date of Patent: Nov. 14, 1995

[54] NYLON ALLOYS

[75] Inventors: Howard A. Scheetz, Lancaster; Gerhardus J. A. deVrught, Wyomissing, both of Pa.

[73] Assignee: DSM N.V., Heerlen, Netherlands

[21] Appl. No.: 144,707

[22] Filed: Oct. 29, 1993

[51] Int. Cl.[6] .................................................. C08L 77/00
[52] U.S. Cl. .................................. 525/432; 525/420
[58] Field of Search ............................................ 525/432

[56] References Cited

U.S. PATENT DOCUMENTS 5,064,700  11/1991  Yasue et al. ........................ 428/36.92
5,206,310  4/1993  Yasue et al. ........................ 525/432

*Primary Examiner*—Ana L. Carrillo
*Attorney, Agent, or Firm*—Richard O. Church

[57] ABSTRACT

Alloys of nylon 4.6 having good thermal stability above their melting points and a broad range of desired properties are prepared by melt mixing nylon 4.6 with at least one other nylon and a nylon copolymer. The inclusion of a copolymer in the alloy provides unexpectedly large increases in ductility and toughness.

Alloys can be formulated with a unique combination of properties including, for example, elongations of at least 100%, Gardner impact strengths of at least 30 joules, tensile strengths of at least 80 MPa, and heat deflection temperatures of at least 85° C.

14 Claims, 1 Drawing Sheet

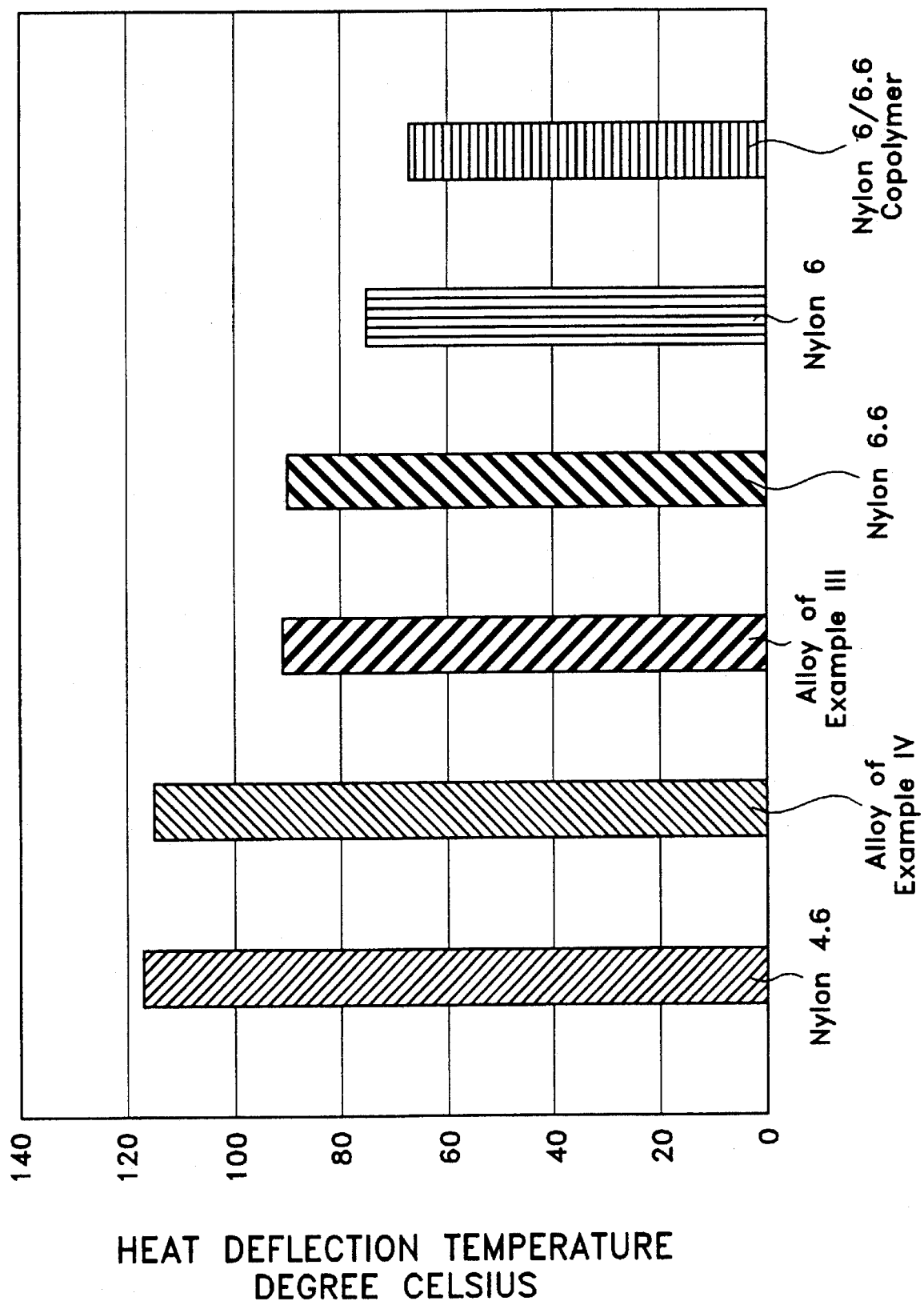

1
NYLON ALLOYS

I. BACKGROUND OF THE INVENTION

A. Field of the Invention

This invention relates to melt blends of polyamide resins (nylons) and particularly to nylon alloys including polytetramethylene adipamide (nylon 4.6) as a constituent. More particularly, the invention relates to alloys of nylon 4.6 in which other nylons in the alloy contribute one or more of their characteristic properties and provide an alloy with a combination of desirable properties exceeding the capabilities of any individual nylon. The desirable properties imparted to articles made from the alloys of this invention include ductility (elongation), toughness (impact strength), high heat distortion temperatures and high melting points. The alloys also are well adapted for use in melt forming processes because of their good melt strength, high melt viscosity, and good melt (thermal) stability.

B. Definitions

As used herein the following terms and test procedures are defined as follows:

1. Melting point (MP).

The exothermic peak which occurs during heating of small samples in a differential scanning calorimeter (DSC) (ASTM D3417).

2. Glass transition temperature ($T_g$).

The damping peak which occurs between the hard glassy phase and the rubbery phase during heating of material on a dynamic mechanical analyzer (DMA) (ASTM 4065).

3. Relative viscosity (RV).

The relative viscosity compares the viscosity of a solution of polymer in formic acid with the viscosity of the formic acid itself (ASTM D 789). The test results reported in this specification were obtained using 10.98 grams of nylon 4/6 dissolved in 100 cc. of formic acid at 25° C.

4. Melt Viscosity (MV).

An indicator of the melt flow characteristic of a resin as measured in Pascal·seconds (Pa·sec) with a Monsanto capillary melt rheometer measured at 316° C. under constant pressure conditions.

5. Degradation ratio (DR).

A measure of the degree of degradation of the melt viscosity of a resin upon heating to above the melting point of the resin calculated by dividing the determined melt viscosity after 5 minutes dwell time by the melt viscosity after 17 minutes dwell time.

6. Heat deflection temperature (HDT).

The temperature at which a rectangular bar of regular cross section deflects 0.025 cm. under a load of 1820 kPa (264 psi) as specified in ASTM D 648-82. The test results given in the Examples were obtained using test specimens as molded (dry and not moisture conditioned) that were 3mm (⅛ in.) in thickness.

7. Gardner Impact Strength.

A test for the relative toughness (impact shock) of a polymer is conducted in accordance with ASTM D 3029 Test Method G using a Gardner variable height impact tester. In the test procedure a standard weight is dropped a measured vertical distance to determine when the test specimen, 0.32 cm. (0.125 in.) shatters. The maximum impact at which the test specimen survives is measured in joules. The Gardner test device used in obtaining the data given in the Examples had a capability of measuring values up to 54 joules (480 inch-pounds) and all specimens surviving this value of impact are rated as >54 joules.

8. Alloys.

Intermolecular blends obtainable, for instance, by melt-blending blended nylons in which each nylon retains its own entity.

9. Copolymers.

Polymers derived from more than one species of monomer, for instance the reaction product of two or more nylons in which the nylons are chemically combined with each other. Copolymers are sometimes referred to as intramolecular blends.

10. Particulate.

An adjective used to describe resins in the form of discrete particles. Particulate resins are sometimes made by chopping small diameter (e.g. 0.5 cm) extruded rods into approximately 0.3 to 0.8 cm. lengths and are also made by compacting powders into small pellets, usually <1 cm. in diameter. The exact size and shape of particulate resins (also sometimes referred to as pellets or molding resins) useful in this invention is not of great importance other than that, for convenience in handling, they should be larger than fine powders and for efficient and reasonable treatment times they should not be larger than about 2 cm., and preferably no larger than about 0.5 cm., in diameter. It should also be mentioned that reference to nylon 4.6 resins, whether in particulate form or otherwise, refers to resins having molecular weights above about 15,000, which are useful, at least, in injection molding processes.

C. Discussion of the Prior Art

This invention is concerned with nylon 4.6 alloyed with other nylons, such as commercially available 6, 6.6, 6.10, 6.12, 11, and 12 nylons and their copolymers.[1] The alloys improve some of the physical properties of nylon 4.6, such as melt viscosity, melt strength, toughness and elongation, without material sacrifice of the unusual high temperature performance of nylon 4.6 as compared with other straight chained, aliphatic nylons.

[1] Nylons are identified in the specification and claims using "." (a period) to separate the number designation of amine and acid groups and "/" (a slash) to separate copolymer components.

Alloys of nylon are known and commercially available as blends of nylon 6 and 6.6, 6.10 or 12 nylons. Nylon alloys may improve some of the properties of the dominant resin but, all too often, do so by sacrificing other desired properties.

The prior art recognizes that alloys of nylon 4.6 can be prepared by melt blending nylon 4.6 with one or a combination of other nylons, such as 6, 6.6, 6.10, 6.12, 11, 12. Reference is made to Japanese patent application 186431/84 filed by Toray Industries which properly teaches that nylon 4.6 is unique among the aliphatic nylons because of its high rate of crystallization and its high thermal deformation temperature but suffers, however, from low thermal stability. The lack of thermal stability, it is said, results in discoloration (yellowing) and decomposition of the nylon in the melt at molding temperatures. The patent application suggests that synergism may be found when nylon 4.6 is blended with nylon 6, 6.6 and possibly other nylons including small amounts of nylons 6.10, 6.12, 11 and 12 because of the better thermal stability which they impart to the alloy without materially sacrificing the heat deflection temperatures of the nylon 4.6.

The teachings of Toray apparently suffer from an insufficient disclosure since attempts to duplicate the properties of the nylon 4.6 alloys disclosed Toray have not proved successful. In this regard, reference is made to European patent application No. 0382277A1 to Stamicarbon B. V. which represents that the properties as reported in the examples (1–3) of Toray can not be obtained when a melt blend of nylon 4.6 and nylon 6 is prepared as taught by Toray and, in fact, the Stamicarbon application reports that a blend of nylons 4.6 and 6 made as taught by Toray discolor upon heating in all cases. The Stamicarbon patent application teaches that improved properties such as reported in Toray could be duplicated only when one of the nylons contained an excess of terminal amino groups or if an amine compound was separately added to the nylon blend. The excess in the number of terminal amino groups, it is said, should be at least twice, and more preferably at least four times the number of the terminal carboxyl groups. Since sources for nylons having an excess of amino end groups, and especially so with regard to nylon 4.6, are scarce, the method taught by Stamicarbon is believed to be of limited commercial utility.

U.S. Pat. No. 5,064,700 is of interest in that it claims a blow molded composition comprised of a melt blended combination of nylon 4.6, at least one other nylon selected from the group consisting of nylon 6, nylon 6.6 and nylon 6/6.6 and a modified polyolefin having at least one functional group selected from the group consisting of carboxylic acid groups, metal carboxylate groups, acid anhydrides, esters and epoxy groups. The patent teaches that without the modified polyolefin, the nylon mixture suffers from the Barus effect (swelling of an extrusion at the orifice of the extruder) making it ". . . impossible to obtain pellets" as would be useful in blow molding processes.

It is also known that alloys of nylon 4.6 and other nylons can be difficult to impossible to utilize in processes above the melting point of nylon 4.6 variously due to problems associated with delamination, die bleed and lack of homogeneity. Apparently, although not specifically discussed, it may be surmised that these problems do not arise in the use of nylon 4.6 alloys as taught by the previously referenced Toray and Stamicarbon patent applications.

II. SUMMARY OF THE INVENTION

Accordingly, it is an object of this invention is to prepare alloys of 4.6 nylon that have improved melt processing characteristics, that are thermally stable and that do not discolor in the melt.

Another object of this invention is to provide nylon alloys of nylon 4.6 nylon and other nylons that are not subject to the Barus effect, delamination, die bleed and lack of homogeneity when the alloys are processed above the melting point of the nylon 4.6.

Another object of this invention is to improve the ductility (elongation) and toughness (impact strength) of nylon 4.6 without materially diminishing its superior thermal properties such as a high heat deflection temperature, glass transition temperature and melting point.

Yet another object of this invention is to prepare an all purpose nylon 4.6 alloy that combines the more desirable features of its component nylons and which is uniquely adapted to melt form a wide range of products.

These and other objects of this invention are achieved by melt blending nylon 4.6 with at least one other nylon, such as 6 or 6.6, and a minor amount of a nylon copolymer. By these means, the desirable high temperature properties of the nylon 4.6, including melting point, glass transition temperature and heat deflection temperature are reasonably well preserved while, at the same time, the beneficial properties of the alloying nylons, including thermal stability, good melt processability, impact strength and ductility are imparted to the alloy.

It has been discovered that unexpectedly and inordinately large improvements in the elongation and toughness of nylon 4.6 can be obtained when nylon 4.6 is alloyed with other nylons when a minor amount of a nylon copolymer is included in the alloys. In the specific instance of an alloy of 4.6 and nylon 6, the addition of a small amount of a nylon copolymer has tripled the elongation of the alloy and increased the Gardner impact strength by a factor of nine. The alloys so prepared have the thermal stability of the alloys suggested by Toray and are prepared without utilizing the excess amine end groups as taught by Stamicarbon. In point of fact, the alloys of the Examples which follow, all were prepared with resins having a combined substantial excess of carboxyl end groups.

The large improvement in the properties of alloys of nylon 4.6 can be achieved by using as the alloying copolymer, for example, nylon 6/6.6 copolymers, which is surprising and unexpected since these copolymers do not contain any nylon 4.6 units.

The properties of the alloys of this invention can be tailor made to suit the end use application by choosing the ratios of the nylon 4.6 with the alloying constituents, which may vary through a wide range. It is possible, for example, to prepare alloys of nylon 4.6 and nylon 6 which have properties similar to or better than that of neat nylon 6.6 in combination with the superior thermal properties and toughness of nylon 4.6 and the high ductility of nylon 6.

III. Brief Description of the Drawing

The FIGURE is a bar graph comparing the heat deflection temperature of the alloy of Example IV with the heat deflection temperature of the component nylons of the alloy.

IV. Examples

All percentages given in the Examples are weight percentages. The sources for the nylons used in the Examples are identified as follows:

| Nylon type | Trade Designation | Manufacturer |
| --- | --- | --- |
| 4.6 | Stanyl TW-300 | DSM NV |
| 6 | H-424 | Hanlon |
| 6.6 | 45 AX | Monsanto |
| 6/6.6 | VY86X | Monsanto |

The above listed nylons where determined to have the following properties:

| Nylon | Elongation (%) | MP (°C.) | HDT (°C.) | AEG-CEG$^2$ (meq/g) | GI (Joules) |
| --- | --- | --- | --- | --- | --- |
| 4.6 | 30 | 295 | 115 | −20 | 49 |
| 6 | 208 | 223 | 75 | +4 | 34 |
| 6.6 | 60 | 265 | 90 | −20 | 16 |

-continued

| Nylon | Elongation (%) | MP (°C.) | HDT (°C.) | AEG-CEG$^2$ (meq/g) | GI (Joules) |
|---|---|---|---|---|---|
| 6/6.6 | 112 | 243 | 67 | −35 | 11 |

The copolymer of 6/6.6 used in the Examples (VY86X) was comprised of 13 wt % of nylon 6 and 87 wt % of nylon 6.6.

EXAMPLE I.

For purposes of comparison, relevant properties of nylon 4.6 are repeated below in Table I.

EXAMPLE II.

An alloy comprised of 60 wt % nylon 4.6 and 40 wt % nylon 6 was prepared by melt mixing in a twin screw mixing extruder in a manner as taught in the Toray application. The measured properties of this alloy are listed in Table I.

EXAMPLE III.

The alloy of Example II. was prepared again, but this time 5 wt % of the copolymer of 6/6.6 was substituted for 5 wt % of the nylon 4.6. The measured properties of this alloy are listed in Table I.

EXAMPLE IV.

An alloy comprised of 55 wt % nylon 4.6, 20 wt % nylon 6.6, 20 wt % nylon 6 and 5 wt % of the copolymer of Example III. was prepared by melt mixing in a twin screw extruder as in Examples II. and III. The measured properties of this alloy are listed in Table I.

TABLE I

|  | Elongation (% at break) | Gardner Impact (Joules) | HDT (°C.) |
|---|---|---|---|
| Example I. | 30 | 49 | 117 |
| Example II. | 41 | 7 | 64 |
| Example III. | 112 | 54 | 91 |
| Example IV. | 88 | 13 | 115 |

As can be seen by comparing the foregoing Examples, the inclusion of a nylon copolymer (Examples III and IV) yielded a marked improvement in the properties listed. Note particularly that the inclusion of the nylon copolymer in the alloy of Example II resulted (Example III) in almost a three fold increase in the elongation, about a nine fold increase in the impact strength and 40% increase in HDT. The corollary to this is also noteworthy: without the nylon copolymer, the alloy of nylon 4.6 and nylon 6 (Example II) displayed the poorer properties of the two resins, i.e. the low impact strength and heat deflection reflected the nylon 6 component and the poor elongation reflected the nylon 4.6 component.

Reference is here made to the bar chart shown in the FIGURE. The FIGURE is one in which the heat deflection temperature of the alloy of Example IV is compared with the heat deflection temperatures of the nylons and the nylon copolymer which are the component parts of the alloy. It is thought surprising that nylon 4.6 can be alloyed with other nylons in accordance with the teachings of this invention to yield alloys in which the heat deflection temperature of the nylon 4.6 essentially is preserved despite the fact that all of the other alloying nylons have heat deflection temperatures that are significantly lower than the heat deflection temperature of the nylon 4.6.

Useful alloys nylon having desirable physical properties have been made in accordance with this invention in which the weight percentages of nylon 6 and nylon 6.6 have each been varied from below about 15 wt % to over 35 wt %, the weight percentages of the nylon copolymer has been varied from below about 3 wt % to over about 8 wt % with the balance being nylon 4.6. Representative of these nylon alloys is an alloy comprised of 44 wt % nylon 4.6, 25 wt % of each nylon 6 and nylon 6.6, and 6 wt % of a 6/6.6 copolymer that produced an alloy having a tensile strength of 80 MPa, an elongation of 72% and a Gardner impact of 39 joules. Another representative alloy was made that was comprised of 33 wt % nylon 4.6, 30 wt % of each nylon 6 and nylon 6.6, and 7 wt % of a 6/6.6 copolymer that produced an alloy having a tensile strength of 78 MPa, an elongation of 112% and a Gardner impact of 31 joules.

Another series of experiments were conducted in preparing alloys of nylon 4.6. The measured properties are shown in Table II. Note that there are several minor discrepancies between the values given in Table I and Table II which are believed due to experimental error.

TABLE II

|  | Nylon 4.6 | Alloy 1 | Alloy 2 | Nylon 6.6 |
|---|---|---|---|---|
| FORMULATION |  |  |  |  |
| Nylon 4/6 (wt %) | 100 | 60 | 55 | 0 |
| Nylon 6 (wt %) | 0 | 40 | 40 | 0 |
| Copolymer (wt %) | 0 | 0 | 5 | 0 |
| Nylon 6/6 (wt %) | 0 | 0 | 0 | 100 |
| MECHANICAL PROPERTIES |  |  |  |  |
| Tensile Strength (MPa) | 96 | 77 | 83 | 82 |
| Elongation (%) | 30 | 40 | 112 | 60 |
| Gardner Impact (joules) | 54 | 6 | 54 | 16 |
| Tensile Modulus (GPa) | 2.9 | 2.8 | 3.2 | 2.8 |
| Heat Deflection Temp (°C.) | 117 | 63 | 91 | 90 |

As can be seen from the above tabularized values, an alloy of this invention can be formulated to approximate many of the properties of nylon 6.6 and significantly improve others. Table II lists measured properties for neat nylon 4.6; an alloy of 4.6 and nylon 6 (Alloy 1); an alloy of 4.6 and nylon 6 with a nylon copolymer (Alloy 2); and neat nylon 6.6.

Table II shows that the physical properties listed for Alloy 2 (the nylon alloy of 4.6, 6 and 6/6.6 of Example III), are equal to or better than those of neat nylon 6.6 resin as listed in the last column of Table II. The properties of the alloy as compared to neat nylon 6.6 resin are almost double in elongation, they are three and a half times greater in impact strength, they are slightly better in tensile modulus, and they are similar in tensile strength and heat deflection temperature.

While the examples are limited to the use of a nylon 6/6.6 copolymer, other nylon copolymers can prove useful in the practice of this invention. These copolymers are not limited to copolymers having but two nylon components and they may also include nylon 4.6 as a component. An example illustrative of both of these types of copolymers is a copolymer comprised of nylons 4.6, 6, 6.6 and 6/6.6. The weight ratio between the different components of the copolyamide may vary between wide ranges. In the case of the 6/6.6 copolyamide, the ratio of 6:6.6 nylons may vary between 10–90 wt % and 90–10 wt % to be effective. These copolyamides are commercially available or can be prepared conventionally by polycondensation starting from the different monomers, or by transamidation in the melt of the different constituent nylons. A preferred copolyamide is comprised of a major weight fraction of nylon 6.6.

Useful nylon alloys having desirable properties may be prepared in accordance with this invention in which the nylon 4.6 is present in amount of from about 20 to about 80 wt %, the copolymer is present in an amount of from about 1 to about 20 wt % and the alloying nylon component is present in an amount of from about 20 to 70 wt %. In a preferred embodiment, the alloying nylon component is comprised of a mixture of approximately equal weight portions of nylon 6 and nylon 6.6.

As a generality it may be stated that an all purpose resin having good balance of properties which will serve many end use applications preferably will have an elongation of at least 100%, a Gardner impact strength of at least 30 joules, a heat deflection temperature of at least 85° C. and a tensile strength of at least 80 MPa.

The ease of mixing and the degree of homogeneity achieved in the melt is improved when the melt viscosities of the several nylon components of the alloy are approximately the same and, for this reason, to the extent a reasonable choice is available, it is preferred to select nylons for use in making the alloys of this invention that have similar viscosities at the melt mixing temperatures.

Preferably the resins should be dry and free from impurities and processed under an oxygen free atmosphere.

If desired, the molecular weight of the alloy can be further increased by solid phase polymerization in an inert dry or humid gas atmosphere at a temperature below the melting point of the alloy.

We claim:

1. A nylon alloy consisting of (a) nylon 4.6, (b) at least one nylon selected from the group consisting of nylon 6 and nylon 6.6 and (c) an alloying nylon copolymer.

2. An alloy according to claim 1 in which the (b) at least one nylon selected from the group consisting of nylon 6 and 6.6 includes both nylon 6 and nylon 6.6 homopolymers.

3. An alloy according to claim 1 wherein the alloying nylon copolymer is a copolymer of nylon 6 and nylon 6.6.

4. An alloy according to claim 3 in which the copolymer is comprised of a major weight fraction of nylon 6.6.

5. An alloy according to claim 4 wherein the copolymer is comprised of 75 to 95 wt % nylon 6.6 and 5 to 25 wt % nylon 6.

6. An alloy according to claim 1 wherein the (c) alloying nylon copolymer includes nylons selected from the group consisting of nylon 4.6, nylon 6 and nylon 6.6.

7. An alloy according to claim 1 in which the (a) nylon 4.6 is present in an amount of from about 20 wt % to about 80 wt %, the (c) alloying nylon copolymer is present in an amount of from about 1 wt % to about 20 wt % and the (b) at least one nylon selected from the group consisting of nylon 6 and nylon 6.6 is present in an amount of from about 20 wt % to about 70 wt %.

8. An alloy according to claim 7 in which the (b) at least one nylon selected from the group consisting of nylon 6 and nylon 6.6 includes both nylon 6 and nylon 6.6 in approximately equal weight percentages.

9. An alloy according to claim 1 which does not visibly discolor when heated above its melting point in heat forming processes.

10. An alloy according to claim 1 in which the alloy has an elongation of at least 100%.

11. An alloy according to claim 1 in which the alloy has a Gardner impact strength of at least 30 joules.

12. An alloy according to claim 1 in which the alloy has a heat deflection temperature of at least 85° C.

13. An alloy according to claim 1 in which the alloy has a tensile strength of at least 80 MPa.

14. A method for preparing alloys of nylon 4.6 which alloys consist of nylon and have improved melt processing characteristics, improved thermally stability and a reduced tendency to discolor in the melt in which nylon 4.6 is melt mixed with at least one nylon selected from the group consisting of nylon 6 and nylon 6.6, the improvement comprising additionally including a nylon copolymer in the alloy.

* * * * *